Mar. 27, 1923.  1,449,414
R. T. KELLER
TRACTOR CLUTCH CONTROL AND BRAKE
Filed Sept. 14, 1922  2 sheets-sheet 1
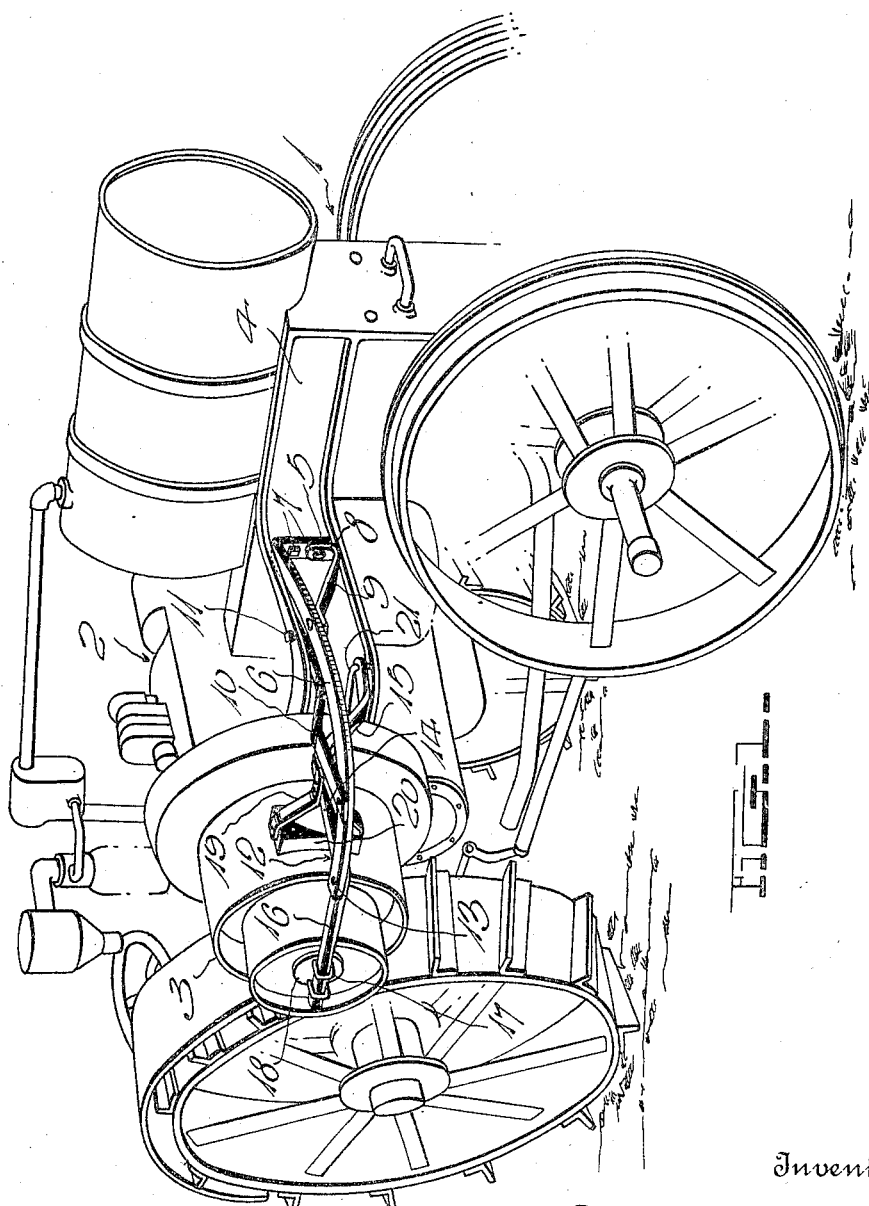
Witness
H. Woodard
Inventor
RAYMOND T. KELLER
By H. R. Willson & Co.
Attorneys

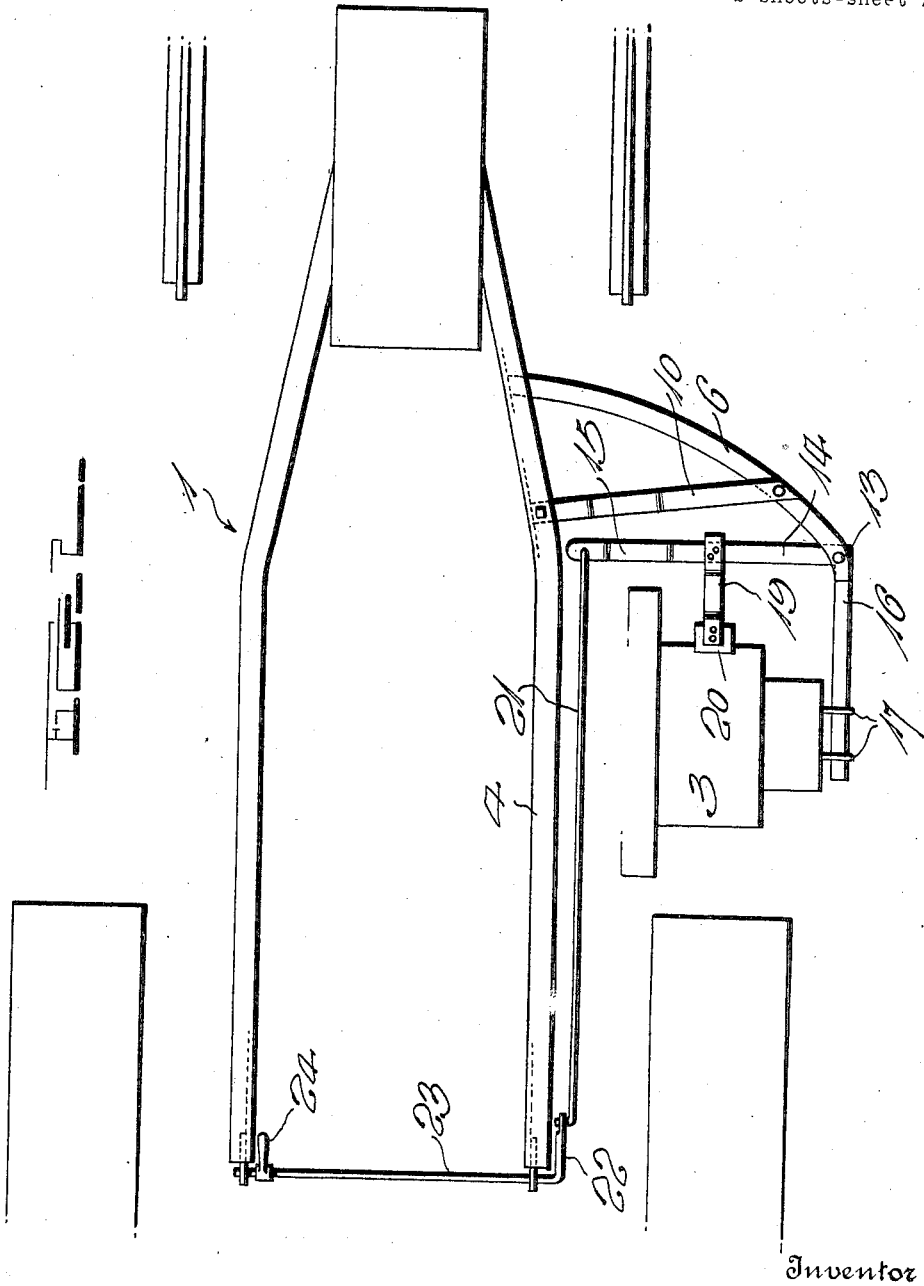

Patented Mar. 27, 1923.

1,449,414

UNITED STATES PATENT OFFICE.

RAYMOND T. KELLER, OF BRADFORD, OHIO.

TRACTOR CLUTCH CONTROL AND BRAKE.

Application filed September 14, 1922. Serial No. 588,260.

*To all whom it may concern:*

Be it known that I, RAYMOND T. KELLER, a citizen of the United States, residing at Bradford, in the county of Darke and State of Ohio, have invented certain new and useful Improvements in Tractor Clutch Control and Brakes; and I do declare the following to be a full, clear, and exact description of the invention, such as will enable others skilled in the art to which it appertains to make and use the same.

My invention has for its object to provide an extremely simple and inexpensive, yet a highly efficient and reliable device for attachment to tractors, for the purpose of simultaneously throwing out the clutch which drives the power take-off pulley and applying a brake directly to said pulley to bring the same to a standstill.

With the foregoing in view, the invention resides in the novel subject matter hereinafter described and claimed, the description being supplemented by the accompanying drawings.

Figure 1 is a perspective view of a tractor embodying my invention.

Figure 2 is a fragmentary plan view.

In the drawings above briefly described, the numeral 1 designates the frame of a tractor which carries an engine 2 whose shaft is provided with a pulley 3 which is here shown of stepped formation. The pulley 3 is spaced outwardly from one of the channel metal side bars 4 of the frame 1 and this side bar inclines forwardly directly in front of the pulley. Secured by bolts or the like to the outer side of the bar 4, between its outstanding flanges, is the downturned end 5 of a horizontal supporting bar 6 which extends laterally from said bar, bolts 7 being preferably provided to secure the bar in place. In the construction shown, one of these bolts passes through the upturned end 8 of an inclined brace bar 9 which is secured at its other end to said bar 6. This last named bar curves rearwardly from its point of connection with the frame 1 and an oblique brace bar 10 is secured at one end to said bar 6 near its rearwardly curved end, the other end of said bar 10 being secured by a bolt or the like 11 to the upper flange of the side bar 4. It will be seen that the bar 10 is secured to the side bar 4 at a lower point than the inner end of the bar 6, whereby to not only brace this bar against rearward movement, but to support it to quite an extent against sagging.

A bell crank 12 is fulcrumed at 13 to the rearwardly curved end of the supporting bar 6 and has one of its arms 14 spaced in front of the pulley 3, directed downwardly on an incline adjacent its free end as indicated at 15, and terminating at the side bar 4. The other end 16 of the bell crank is spaced outwardly from the end of the pulley 3 and is connected by U bolts or the like 17 with a clutch operating collar 18 having suitable connection with the clutch within the pulley 3, for controlling the driving of the latter. The arm 14 is provided between its ends with rearwardly diverging upper and lower arms 19 which are secured to the ends of a vertically disposed brake shoe 20. When the lever is rocked to throw the clutch out of operation, the brake shoe 20 is moved into contact with the pulley 3 and the latter is then brought to a standstill.

For operating the bell crank 12, I connect an operating rod 21 to the arm 14, extend said rod rearwardly along the side bar 4 to a crank arm 22 on a transverse rock shaft 23 carried by the frame 1, and provide this rock shaft with a suitable hand lever 24.

By employing the construction shown or a substantially equivalent construction, a device is provided which is simple and inexpensive, may be quickly and easily attached to an ordinary tractor, and will be highly efficient in use. Since excellent results have already been obtained from the details disclosed, they are preferably followed, but within the scope of the invention as claimed, numerous minor changes may be made.

I claim:

1. The combination with a tractor frame having a clutch-controlled engine-driven pulley spaced outwardly from one of its side bars; of a rigid frame secured to and extending laterally from said tractor frame, a bell crank fulcrumed on said laterally extending frame and having one arm connected with the pulley clutch, a pulley-engaging brake shoe carried by the other arm of said bell crank, and means mounted on the tractor frame and connected with the last named arm of the bell crank for operating the latter.

2. The combination with a horizontal tractor frame having a clutch-controlled engine-driven pulley spaced outwardly from one side bar of the frame; of a horizontal supporting bar rigidly secured at one end to said side bar at a point spaced in advance of the pulley, said bar curving rearwardly toward its other end, an oblique brace bar secured to said supporting bar near its rearwardly curving end and also rigidly secured to said side bar, a horizontal bell crank fulcrumed to said rearwardly curved end of said supporting bar, said bell crank having one of its arms spaced in front of said pulley and its other arm extending rearwardly at the outer end of said pulley, said last named arm being connected with the pulley clutch, said first named arm terminating at said side bar, a rod pivoted to said first named arm and extending rearwardly along said side bar between the latter and the pulley, an operating lever on the frame for operating said rod, and a brake shoe carried by said first named arm for co-action with said pulley when the bell crank is moved to throw the clutch out.

In testimony whereof I have hereunto affixed my signature.

RAYMOND T. KELLER.